Figure 1:
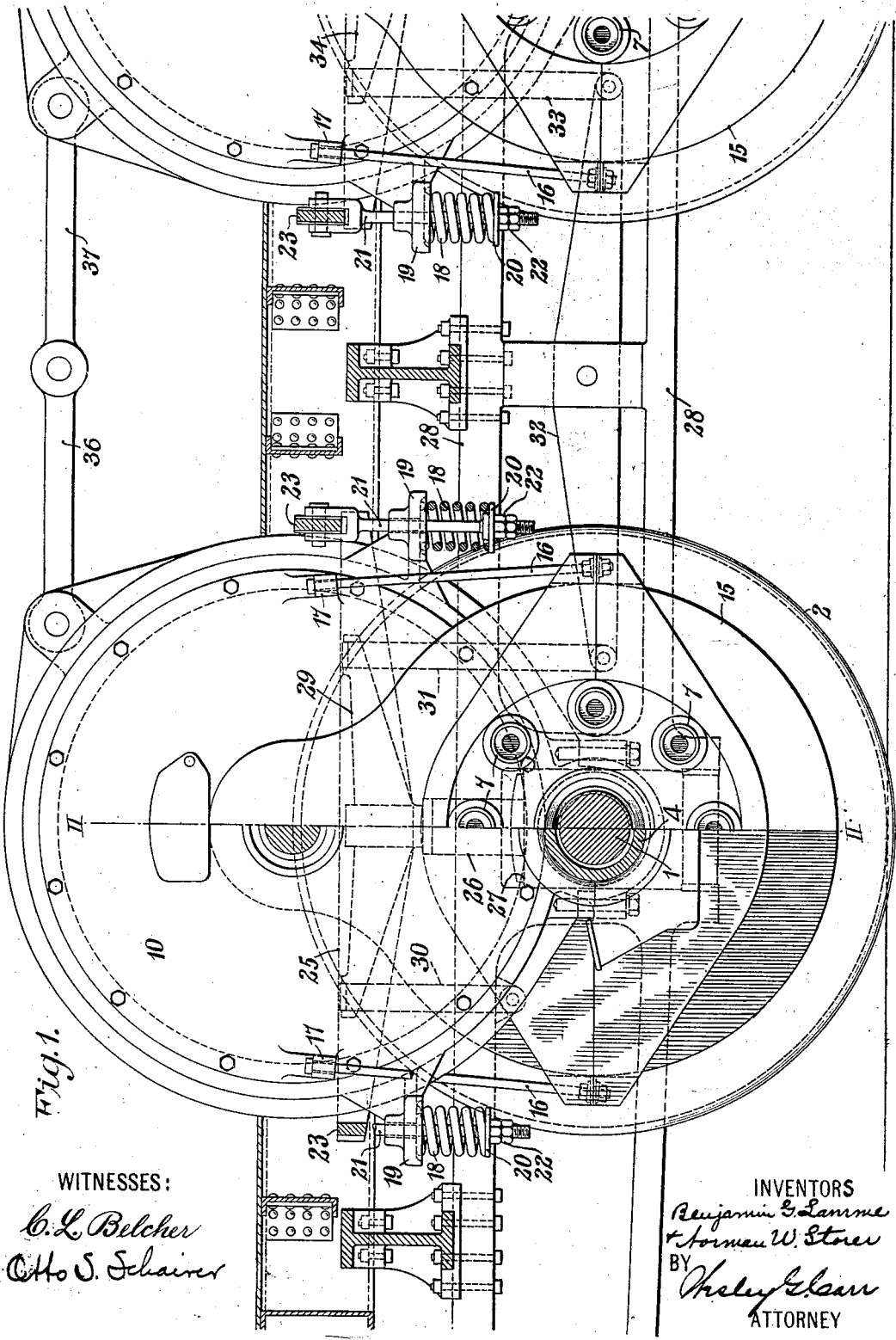

UNITED STATES PATENT OFFICE.

BENJAMIN G. LAMME AND NORMAN W. STORER, OF PITTSBURG, PENNSYLVANIA, ASSIGNORS TO WESTINGHOUSE ELECTRIC & MANUFACTURING COMPANY, A CORPORATION OF PENNSYLVANIA.

ELECTRIC LOCOMOTIVE.

No. 896,220.     Specification of Letters Patent.     Patented Aug. 18, 1908.

Application filed January 5, 1907. Serial No. 350,965.

*To all whom it may concern:*

Be it known that we, BENJAMIN G. LAMME and NORMAN W. STORER, citizens of the United States, and residents of Pittsburg, in the county of Allegheny and State of Pennsylvania, have invented certain new and useful Improvements in Electric Locomotives, of which the following is a specification.

Our invention relates to electrically driven locomotives, and it has for its object to so construct and arrange the parts of locomotive or other vehicle trucks and the suspension means for the propelling motors as to render the same more effective and satisfactory in operative service than other structures heretofore employed.

In vehicles that are provided with speed-changing connections, such as gearing, between the propelling motors and the driving axles or wheels, the motors are usually so mounted that their armature shafts and the driving axles are in substantially the same horizontal plane and, in such cases, the motors are supported at one side by means of bearings upon the driving axles, and at the other side by suitable resilient means. However, when locomotives are equipped with motors having sufficient power to haul heavy trains, the motors are so large and heavy that it is frequently difficult to mount them in the manner above mentioned without unduly extending the wheel bases and enlarging the driving axle bearings of the motors.

It is generally desirable that a very powerful motor shall be resiliently connected to the driving axle in order to lessen the severity of the shocks to which the parts are subjected in service, and a suitable means for this purpose comprises a quill loosely surrounding the driving axle and having radial arms or flanges from which bosses project into corresponding chambers in the driving wheels, the bosses being surrounded within the chambers by resilient means, such as the springs that constitute the subject-matter of Patent No. 817,133 granted April 3rd, 1906 to the Westinghouse Electric & Manufacturing Company as assignee of Robert Siegfried. In the structure just specified, the motor is provided with supporting bearings upon the quill, instead of upon the axle, and may be operatively connected to the quill by means of gears. The driving springs are, therefore, not only subjected to the strains resulting from the torque of the motor, but they also support a portion of the weight of the motor and must, accordingly, have greater strength than is required for receiving and applying the motor torque.

In the present instance, the motors are mounted with their axes substantially vertically above the driving axles, in which position they are not so important a factor as formerly in determining the length of the wheel base of the vehicle. The motors are also resiliently supported directly upon the journal boxes of the vehicle, independently of the truck frame that carries the remaining parts of the vehicle, and in such a manner that the portions of the motor weights carried respectively by the resilient supports and by the driving springs may be adjusted. Thus, the driving springs and the bearings of the motors upon the quills may, if desired, be relieved of the greater portions of the weights of the motors. Another material advantage of the present arrangement is that the resilient supporting means for the motors are relieved of portions of the motor weights by the vertical components of the reactions caused by the torques of the motors for both directions of rotation.

Figure 2:
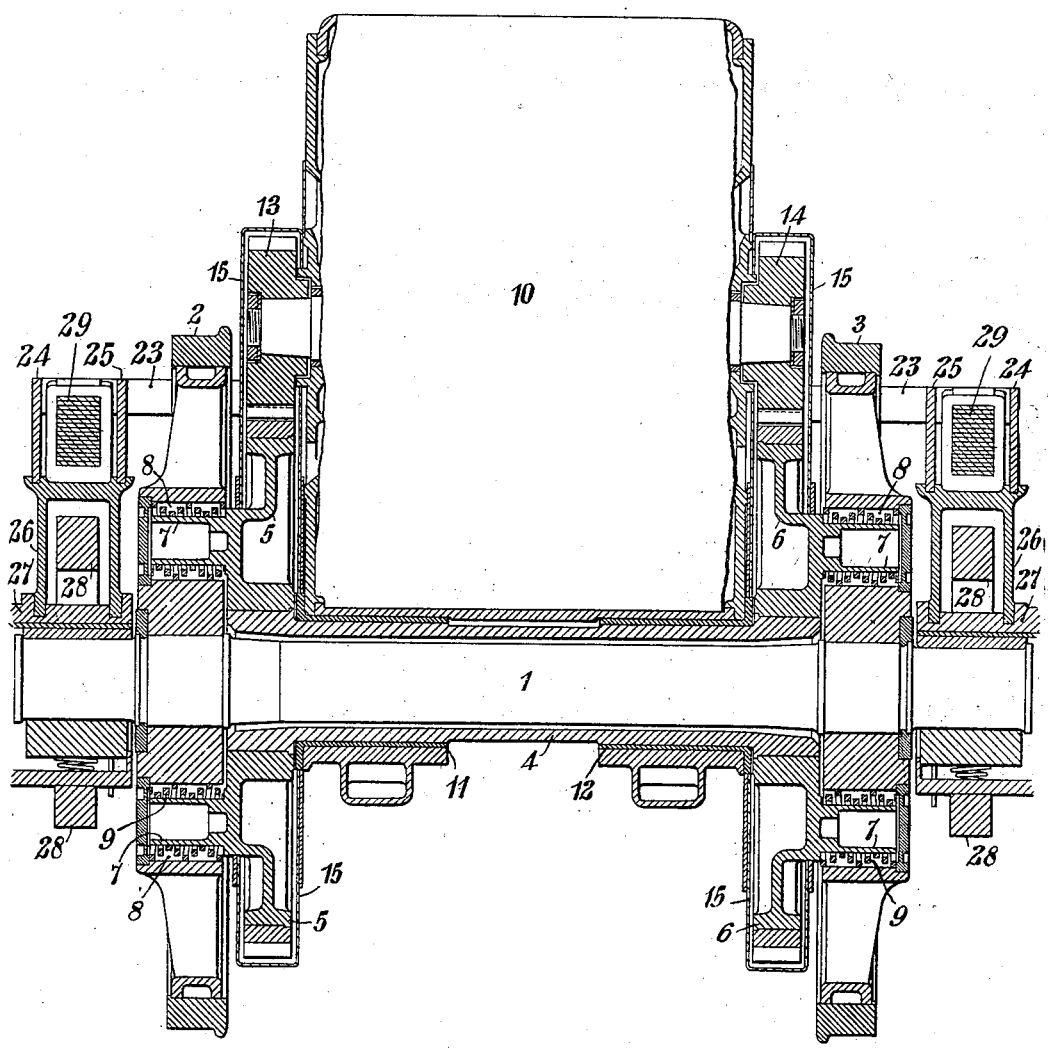

Figure 1 of the accompanying drawings is a view, partially in side elevation and partially in section, of a locomotive truck with a motor mounted thereon in accordance with our invention, and Fig. 2 is a vertical, sectional view through the motor axis and the axis of the corresponding truck axle, the greater portion of the motor, however, being shown in outline.

A main axle 1 of a locomotive or other vehicle is provided, near its ends, with driving wheels 2 and 3 and is loosely surrounded, between the wheels, by a sleeve or quill 4 upon the ends of which are mounted gear wheels 5 and 6 having cylindrical bosses 7 that project, from their outer faces, into corresponding chambers 8 in the wheels 2 and 3. The bosses 7 may be surrounded within the wheel chambers by any suitable resilient means, but the means which we prefer are specially formed helical springs 9 that constitute the subject-matter of the above mentioned Patent No. 817,133. Mounted with its axis substantially vertically above the axis of the driving axle 1, is a motor 10 that is provided with bearings 11 and 12 upon the quill 4 and is operatively connected to the respective gear wheels 5 and 6 by means of pinions 13 and 14. The gears 5 and 13 and 6 and 14 are inclosed by casings 15 that are supported, by means of rods 16, from lugs 17 formed integral with the motor frame or casing.

The motor 10 is supported upon helical compression springs 18 that are interposed between lugs 19 formed integral with the motor frame and stops or plates 20 that are secured upon the lower screw threaded ends of rods 21 by means of nuts 22, whereby the portions of the weight of the motor carried by the respective sets of springs 9 and 18 may be adjusted. The upper bifurcated ends of the bolts 21 embrace and are secured to cross bars 23 of a rectangular frame that surrounds the motor. The sides of the rectangular frame comprise two bars 24 and 25 that are spaced apart a suitable distance and are seated at their middle points upon supports 26 mounted directly upon journal bearings 27 of the vehicle, it being possible, in this manner, to resiliently support the greater portion of the weight of the motor directly upon the journal bearings.

A truck frame 28 for the vehicle is also resiliently supported upon the main journals, but independently of the motor, by means of leaf springs 29, that are also seated at their middle points upon the supports 26 and the extremities of which are connected to the truck frame by means of links 30 and 31. The lower ends of the links 30 are connected directly to the main portion of the truck frame while the links 31, which are longer than the links 30, are connected, at their lower ends, to bars 32 that are pivotally connected, at their middle points, to the main portion of the truck frame, the opposite ends of the bars 32 being connected, by means of links 33, similar to the links 31, to the ends of leaf springs 34 that are similar in structure and function to the springs 29. While thus far, the description has pertained only to a single motor and its mounting, it will, of course, be understood that vehicles will usually be provided with a plurality of similarly mounted motors, as indicated in Fig. 1, and that the motors may be connected together and to a relatively fixed part, such as the cab or body of the vehicle, (not shown) by means of links 36 and 37.

Since the motors are not, in the present instance, located between the driving axles, they do not interfere with placing the axles as near together as may be otherwise convenient or desirable and, consequently, they do not enter seriously into consideration while determining the wheel base of a vehicle, and there is less restriction upon the size of the motors. The motors are also resiliently supported entirely independent of the truck frame, and the driving springs 9 may be relieved of the greater portions of the weights of the motors and be subjected only to the strains resulting from the torques of the motors, or they may be caused to carry any desired portions of the motor weights. The bearings 11 and 12 of each motor upon the quill may also be of smaller dimensions and simpler in construction than would be necessary if they were required to support the entire weight of the motor. Since the reaction of the torque of the motor exerted through the gearing is directed along a line making an angle of approximately 15° (the usual angle of obliquity of gears) above the horizontal, the vertical component of this reaction will exert a lifting moment upon the motor and consequently relieve the springs 18 of a corresponding amount of weight for both directions of rotation of the motor. As the motors have been mounted, heretofore, the reaction of the torque of the motor exerts a lifting moment upon the motor for only one direction of rotation, the reaction being added to the weight for the other direction of rotation. By reason of the location of the motors above the driving axles the center of gravity of the vehicle is correspondingly high and, consequently, the shocks resulting from axial movements of the motors will be less readily transmitted to the driving wheels and the track rails, and may be more conveniently cushioned and relieved by the suspension means, than would be possible if the center of gravity were lower. Such location of the motors also renders the armature bearings and other parts thereof more readily accessible for inspection and attendance, and it removes them further from the dirt and slush along the roadbed than would otherwise be the case.

We claim as our invention:

1. The combination with an axle, driving wheels mounted thereon, a sleeve or quill surrounding the axle between the wheels, and resilient connections between the sleeve and the wheels, of a motor mounted with its axis substantially vertically above the said axle and provided with bearings upon the sleeve and operative connections therewith, journal bearings for the axle, a truck frame, and means for independently and resiliently supporting the truck frame and the motor upon the journal bearings.

2. The combination with an axle and journal bearings therefor, of a sleeve or quill loosely surrounding the axle and having resilient connection therewith, a motor mounted with its axis substantially vertically above the axle, and means for resiliently supporting the same upon the journal bearings.

3. The combination with an axle, of a motor mounted above the axle, a resilient operative connection between the motor and the axle, bearings for the axle, means for resiliently supporting the motor upon the bearings, and means for adjusting the portions of the weight of the motor carried respectively by the resilient operative connection and the resilient supporting means.

4. The combination with an axle, of a motor resiliently geared thereto and mounted so that the vertical component of the reaction of the torque exerted thereby opposes the action of gravity upon the motor equally for both directions of rotation.

5. The combination with an axle, of a motor resiliently geared thereto and mounted so that for both directions of rotation the reaction of the torque of the motor is directed with respect to the action of gravity at an angle equal to 90° plus the angle of obliquity of the gears.

6. The combination with an axle, of a motor resiliently geared thereto and mounted so that for both directions of rotation the reaction of the torque of the motor is directed at an angle above the horizontal equal to the angle of obliquity of the gears.

In testimony whereof, we have hereunto subscribed our names this 31st day of December, 1906.

BENJ. G. LAMME.
NORMAN W. STORER.

Witnesses:
OTTO S. SCHAIRER,
BIRNEY HINES.